Jan. 20, 1925.
P. VILLEMER
1,523,465
MACHINE FOR THE REMOVAL OF FAT FROM THE SMALL INTESTINES OF THE COW
Filed June 25, 1924    2 Sheets-Sheet 1
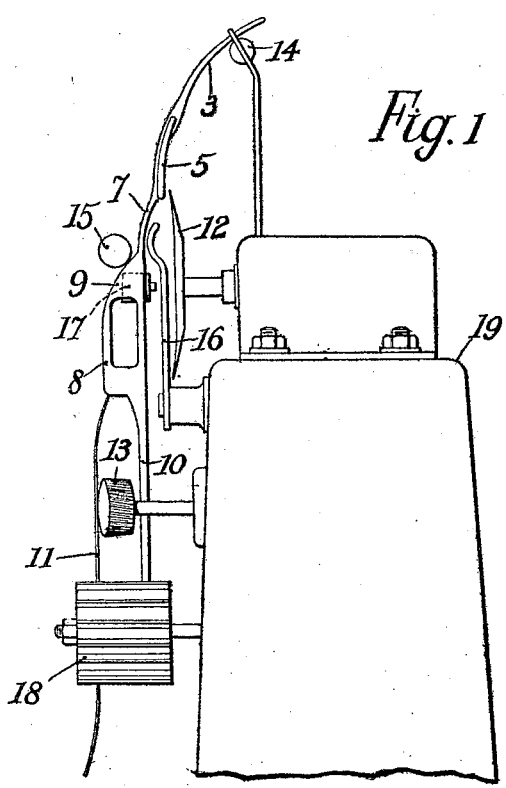
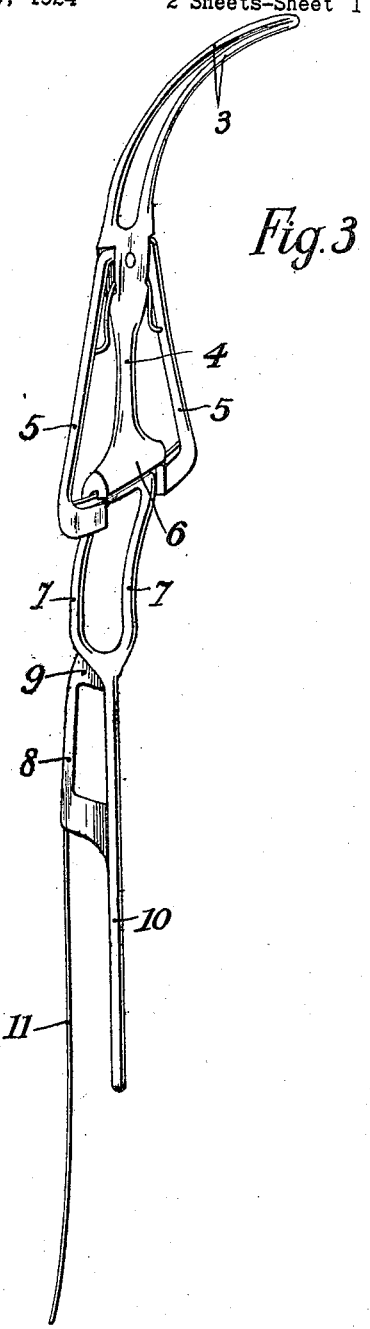
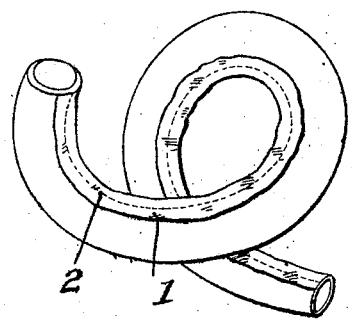
Inventor
P. Villemer
By Marks & Clerk
Attys.

Jan. 20, 1925.
P. VILLEMER
1,523,465
MACHINE FOR THE REMOVAL OF FAT FROM THE SMALL INTESTINES OF THE COW
Filed June 25, 1924    2 Sheets-Sheet 2
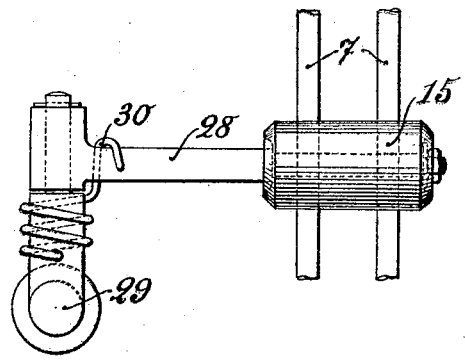
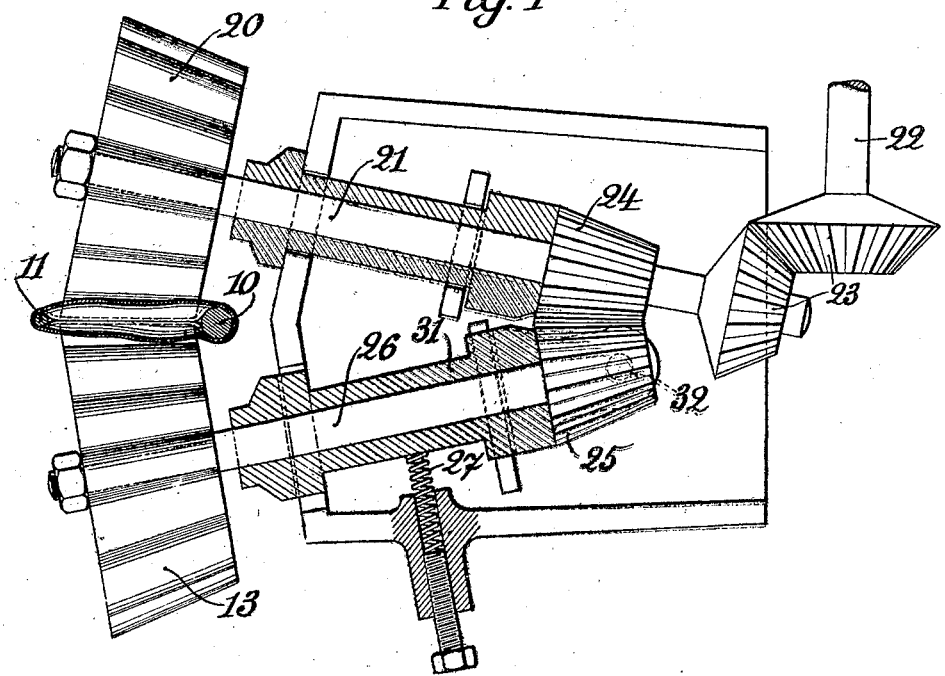

Patented Jan. 20, 1925.

UNITED STATES PATENT OFFICE.

1,523,465

PIERRE VILLEMER, OF PARIS, FRANCE, ASSIGNOR TO SOCIETE ANONYME FABRE & CIE., OF AUBERVILLIERS, FRANCE.

MACHINE FOR THE REMOVAL OF FAT FROM THE SMALL INTESTINES OF THE COW.

Application filed June 25, 1924. Serial No. 722,385.

*To all whom it may concern:*

Be it known that I, PIERRE VILLEMER, a citizen of the Republic of France, and residing at Paris, Seine Department, No. 167 Boulevard Malesherbes, in the Republic of France, industrial, have invented certain new and useful Improvements in Machines for the Removal of Fat from the Small Intestines of the Cow, of which the following is a specification.

The present invention relates to a machine for the removal of fat from the small intestines of the cow. This operation, consisting in the removal of the fat which covers about one-half the circumference of the bowel, being performed automatically in this machine, the latter being operated by a single workman whose function consists solely in feeding the bowels into the machine.

For this purpose, the bowel is engaged and guided from one end of the machine to the other upon a mandrel of special construction and characterized by the fact that it is extensible in the transverse direction upon a portion of its length so as to distend the bowel and to place it flatwise in the proper position for cutting off the layer of fat.

This cutting is performed by a circular knife rotating at high speed, whose cutting angle is such that the substance of the bowel will not be acted upon; suitable scrapers comprised in the machine serve for the removal of all fat which has not been removed by the said knife. The forward feeding of the bowel through the machine is carried out by means of fluted rollers of tapered shape, preferably of india rubber, which are engaged with each other.

The appended drawing which is given by way of example represents a constructional form of the machine according to the invention.

Fig. 1 is a diagrammatic side elevation of the machine.

Fig. 2 shows a portion of the bowel.

Fig. 3 is a perspective view of the mandrel.

Fig. 4 is a plan view showing the arrangement of the bevel gears 13 and 20.

Fig. 5 is a partial front elevation of the machine showing the roller 15 and its spring-mounted support.

It is observed that in the small intestine of the cow, the fat appears as a band 1 covering about half the circumference of the bowel and maintained by a cord 2 whose effect is to roll the bowel upon itself in a helical form; as shown in Fig. 2.

The said machine comprises a frame 19 having mounted thereon—in a manner which will be further described—a mandrel which may be of metal or other substance and is constituted as follows. A curved portion 3 serves for the insertion of the bowel which the operator engages upon the mandrel, and due to the curvature of this latter, the bowel will automatically take the proper position for the removal of the fat, i. e. the layer of fat will be stretched according to the chord of an arc constituted by the part 3; this latter part, which has two branches as shown in Fig. 3, terminates in a central part 4 on each side of which are pivoted the branches 5; springs mounted upon the part 4 tend to separate the said branches therefrom, so that the bowel is stretched flatwise and is brought against a flat part 6 of the branch 4, the knife exercising its action upon the bowel at the place where the latter is in contact with the part 6. The curved end of the branches 5 is slidable in a groove formed at the base of the central part 4.

The extensible portion of the mandrel is followed by a curved portion 7 and by the part 8 which is perpendicular to the first and constitutes the shoulders 9. The mandrel terminates in a guide portion consisting of two rods, a rigid rod 10 and a flexible rod 11 consisting for example of iron wire; the said guide portion, which extends outwardly of the part 8, will thus form a plane perpendicular to the plane of the part 6.

The circular knife consists of a metal disc 12 mounted on the end of a shaft which is driven by any suitable means and rotates at a high speed (3000–4000 R. P. M.) so that the said knife is enabled to cut the layer of fat, even if it is imperfectly sharpened; the edges of the said blade on the side next the bowel are somewhat concave so as to offer a cutting angle which acts on the fat without touching the substance of the bowel.

The bowel is drawn forward upon the said mandrel by two tapered rollers 13 and 20 of india rubber or the like which are disposed upon the guiding part of the mandrel and are engaged with each other; the tapered form of the said rollers is specially chosen so that they will be adapted to the shape of the bowel, and the latter is thus drawn forward, being subjected to equal traction stresses in its portion having the large curvature and in the portion having the small curvature, so that there will be no risk of tearing the bowel. The roller 20 is mounted upon a shaft 21 which is actuated by shaft 22 through the medium of a gear set 23. Before leaving the mandrel, the bowel is acted upon by a pair of scrapers 18 of the kind described in French Patent No. 565,843 of May 5th 1923, each consisting of a cylinder having mounted thereon a set of flexible strips; when the bowel passes between the said scrapers, which rotate at a considerable speed (about 2000 R. P. M.), it will be freed from the fat which has escaped the action of the circular knife.

The mandrel is maintained upon the frame 19 in a fixed position relative to the circular knife 12 by means of a set of rollers and guides in such manner that the said knife will come flush with the bowel and will cut off the layer of fat without touching the substance of the bowel whatever may be the traction exercised on the bowel to draw it forward.

For this purpose, the upper curved part 3 of the mandrel is supported by a loose roller 14 which also limits the length of the chord which may be formed by the layer of fat relative to the arc offered by the mandrel from the free end of the part 3 to the flat part 6. A second loose roller 15, Fig. 5, is mounted upon a shaft 28 pivoted to a support 29 and subjected to the action of a spring 30, and this roller 15 disposed on a spring-mounted pivoting support, applies the mandrel against the knife 12, and a tappet 16 maintains the said mandrel at a determined distance from the blade 12 so that the latter can have no action upon the substance of the bowel. Two loose rollers 17— only one of which is shown—serve to support the mandrel which rests thereupon by means of its shoulders 9.

The operation is as follows:

With the mandrel in place upon the frame 1 and the knife 12 rotating at the standard speed, the operator fits the bowel upon the curved end 3 of the mandrel so that the layer of fat will be on the under side, and he draws forward the bowel by hand until it is engaged with the rollers 13. During this operation, care is taken to move aside the roller 15 which is suitably mounted for the purpose, so as to afford passage to the fingers drawing the bowel. When the bowel has been seized by the rollers 13 and 20, the operator ceases to grasp it, and he puts in place the roller 15; the movement of the bowel upon the mandrel now continues automatically the layer of fat is stretched by the curved part 3 of the mandrel and it passes before the knife 12 which removes the fat, the latter being dropped at the side of the machine by a suitable trough, not shown. The bowel then passes between the scrapers 18 which remove the last portions of the fat, and it is guided by the two branches 10 and 11 of the mandrel as far as the output end of the machine.

Obviously, suitable modifications may be made in the form and disposition of the several parts of the machine without departing from the principle of the invention, the constructional form hereinbefore described being given solely by way of example.

For instance it is evident that by increasing the number of the different elements above mentioned, the fat may be removed from bowels of all kinds having a layer of fat upon the whole or a part of the periphery. On the other hand, the extensible mandrel may serve to effect a calibration of the bowels when passing through the machine, to this end, one may adapt to the said extensible part suitable measuring means such as a graduated ruler, a pointer moving upon a dial, or the like, and the spacing of one or both branches 5, counted from the fixed central part 4, will thus measure the elasticity of the bowel fitted upon the said mandrel and will enable the classification of the different bowels in view of their subsequent use. The said measuring device may be optionally completed by registering means.

Claims:

1. In a machine for the removal of fat from the small intestines of the cow, the combination of a frame, a mandrel mounted thereon, said mandrel comprising a curved portion for the insertion of the bowel consisting of two branches and terminated by a central portion, other branches pivoted at either side of the said central portion, springs secured to the said central portion and adapted to separate the said pivoted branches therefrom in such manner that the bowel will be distended flatwise, a flat portion formed at the base of the said central portion, and having the bowel applied thereupon and a knife acting upon the bowel at the point where the latter passes over the said flat portion.

2. In a machine for the removal of fat from the small intestines of the cow, the combination of a frame, a mandrel mounted thereon, said mandrel comprising a curved portion for the insertion of the bowel consisting of two branches and terminated by a central portion, other branches pivoted at either side of the said central portion, springs secured to the said central portion and adapted to separate the said pivoted branches therefrom in such manner that the bowel will be distended flatwise, the ends of the said branches being curved and slidable in a groove formed at the base of the said central portion.

3. In a machine for the removal of fat from the small intestines of the cow, the combination of a frame, a mandrel mounted thereon, said mandrel comprising a curved portion for the insertion of the bowel consisting of two branches and terminated by a central portion, other branches pivoted at either side of the said central portion, springs secured to the said central portion and adapted to separate the said pivoted branches therefrom in such manner that the bowel will be distended flatwise, the said pivoted branches being followed by a curved portion succeeded in turn by a portion which is perpendicular to the preceding in order to form shoulders.

4. In a machine for the removal of fat from the small intestines of the cow, the combination of a frame, a mandrel mounted thereon, said mandrel comprising a curved portion for the insertion of the bowel consisting of two branches and terminated by a central portion, other branches pivoted at either side of the said central portion, springs secured to the said central portion and adapted to separate the said pivoted branches therefrom in such manner that the bowel will be distended flatwise, the said pivoted branches being followed by a curved portion succeeded in turn by a portion which is perpendicular to the preceding in order to form shoulders, and a guiding portion consisting of two rods whereof one is rigid and the other flexible, the said guiding portion being adapted to form a plane perpendicular to the plane of the pivoted branches.

5. In a machine for the removal of fat from the small intestines of the cow, the combination of a frame, a mandrel mounted thereon, said mandrel comprising a curved portion for the insertion of the bowel consisting of two branches and terminated by a central portion, other branches pivoted at either side of the said central portion, springs secured to the said central portion and adapted to separate the said pivoted branches therefrom in such manner that the bowel will be distended flatwise, a flat portion formed at the base of the said central portion, and having the bowel applied thereupon and a knife acting upon the bowel at the point where the latter passes over the said flat portion, said knife consisting of a metal disc with slightly concave edges.

6. In a machine for the removal of fat from the small intestines of the cow, the combination of a frame, a mandrel mounted thereon, said mandrel comprising a curved portion for the insertion of the bowel consisting of two branches and terminated by a central portion, other branches pivoted at either side of the said central portion springs secured to the said central portion and adapted to separate the said pivoted branches therefrom in such manner that the bowel will be distended flatwise, a flat portion formed at the base of the said central portion, and having the bowel applied thereupon and a knife acting upon the bowel at the point where the latter passes over the said flat portion and two tapered rollers serving to draw the bowel upon the said mandrel and engaging with each other, one of the said rollers being urged by a spring whereby it is pressed against the said bowel in an elastic manner.

7. In a machine for the removal of fat from the small intestines of the cow, the combination of a frame, a mandrel mounted thereon, said mandrel comprising a curved portion for the insertion of the bowel consisting of two branches and terminated by a central portion, other branches pivoted at either side of the said central portion, springs secured to the said central portion and adapted to separate the said pivoted branches therefrom in such manner that the bowel will be distended flatwise, a flat portion formed at the base of the said central portion, and having the bowel applied thereupon and a knife acting upon the bowel at the point where the latter passes over the said flat portion and scrapers adapted to remove the fat which remains after the operation of the said circular knife.

8. In a machine for the removal of fat from the small intestines of the cow, the combination of a frame, a mandrel mounted thereon, said mandrel comprising a curved portion for the insertion of the bowel consisting of two branches and terminated by a central portion, other branches pivoted at either side of the said central portion, springs secured to the said central portion and adapted to separate the said pivoted branches therefrom in such manner that the bowel will be distended flatwise, a flat portion formed at the base of the said central portion, and having the bowel applied thereupon and a knife acting upon the bowel at the point where the latter passes over the said flat portion the said mandrel being supported and maintained upon the frame in a fixed position relative to the circular knife by means of a set of rollers and guides.

9. In a machine for the removal of fat from the small intestines of the cow, the combination of a frame, a mandrel mounted thereon, said mandrel comprising a curved portion for the insertion of the bowel consisting of two branches and terminated by a central portion, other branches pivoted at either side of the said central portion, springs secured to the said central portion and adapted to separate the said pivoted branches therefrom in such manner that the bowel will be distended flatwise, a flat portion formed at the base of the said central portion, and having the bowel applied thereupon and a knife acting upon the bowel at the point where the latter passes over the said flat portion a loose roller adapted to support the upper curved portion of the said mandrel, a second loose roller disposed upon a spring mounted against the said knife a tappet serving to maintain the said mandrel at a stated distance from the knife blade, and two loose rollers adapted to support the said mandrel.

In testimony that I claim the foregoing as my invention, I have signed my name in presence of two subscribing witnesses.

PIERRE VILLEMER.

Witnesses:
CAMILE BLÉTRY,
MAURICE ROUX.